United States Patent
Asano

(10) Patent No.: US 9,878,582 B2
(45) Date of Patent: Jan. 30, 2018

(54) PNEUMATIC TIRE

(71) Applicant: SUMITOMO RUBBER INDUSTRIES, LTD., Kobe-shi, Hyogo (JP)

(72) Inventor: Kazuo Asano, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 886 days.

(21) Appl. No.: 13/856,293

(22) Filed: Apr. 3, 2013

(65) Prior Publication Data

US 2013/0269853 A1 Oct. 17, 2013

(30) Foreign Application Priority Data

Apr. 12, 2012 (JP) .................. 2012-090644

(51) Int. Cl.
| | |
|---|---|
| B60C 9/02 | (2006.01) |
| B60C 5/00 | (2006.01) |
| B60C 11/00 | (2006.01) |
| B60C 9/28 | (2006.01) |

(52) U.S. Cl.
CPC .............. B60C 5/00 (2013.01); B60C 9/0292 (2013.01); B60C 9/28 (2013.01); B60C 11/0083 (2013.01); B60C 2011/0033 (2013.01); Y02T 10/862 (2013.01); Y10T 152/10765 (2015.01)

(58) Field of Classification Search
CPC ..... B60C 9/28; B60C 9/0292; B60C 11/0083; B60C 2011/0033; Y10T 152/10765
See application file for complete search history.

(56) References Cited

U.S. PATENT DOCUMENTS

| | | | |
|---|---|---|---|
| 5,503,205 A | 4/1996 | Aoki et al. | |
| 5,630,893 A * | 5/1997 | Williams | ................. B60C 3/04 |
| | | | 152/209.14 |
| 6,073,668 A | 6/2000 | Iwasaki et al. | |

FOREIGN PATENT DOCUMENTS

| | | |
|---|---|---|
| JP | 57-87704 A | 6/1982 |
| JP | 4-5106 A | 1/1992 |
| JP | 6-199105 A | 7/1994 |
| JP | 11-1103 A | 1/1999 |

* cited by examiner

*Primary Examiner* — Michael H Wilson
*Assistant Examiner* — Philip N Schwartz
(74) *Attorney, Agent, or Firm* — Birch, Stewart, Kolasch & Birch, LLP

(57) ABSTRACT

A pneumatic tire 1 includes: a tread 2; sidewalls 3; a carcass 5; and a belt 6. A distribution of a thickness Tg(y) of the tread in a region extending in an axially outward direction of the tire, is represented by equation Tg(y)=A−a×Ct(y). A represents a thickness of the tread at a crown center 17. Ct(y) represents a distribution of a displacement of the tread surface in a radially inward direction of the tire, in a region from the crown center to an end portion of the belt. a represents a coefficient selected from a range of values that are greater than or equal to 0.10, and are not greater than 0.35. A displacement Cc(y) of the carcass 5 in the radially inward direction of the tire, in a region extending in the axially outward direction of the tire from the crown center, is represented by equation Cc(y)=(1−a)×Ct(y).

4 Claims, 4 Drawing Sheets

PNEUMATIC TIRE

This application claims priority on Patent Application No. 2012-090644 filed in JAPAN on Apr. 12, 2012. The entire contents of this Japanese Patent Application are hereby incorporated by reference.

BACKGROUND OF THE INVENTION

Field of the Invention

The present invention relates to pneumatic tires.

Description of the Related Art

To date, it has been known that rolling resistance of tires adversely affects running performance and fuel consumption rate of vehicles, and the like. Causes of rolling resistance include: resistance due to hysteresis loss caused by repeated deformation of tire components formed of rubbers and/or cords; air resistance; frictional resistance between a road surface and the tire; and the like, and these resistances are caused by rotation of the tire. Among them, resistance due to hysteresis loss in tire components, is a main cause.

Therefore, various measures to reduce rolling resistance of tires have been taken to date. As one of these measures, a method has been known in which a rubber having a relatively low energy loss is used for a tread that is greatly deformed during running and that has used therein an increased amount of rubber. However, in this method, grip performance of the tire may be deteriorated. In particular, a problem arises that wet grip performance may be deteriorated.

Another method is known in which a height of a flange of a rim to be used is reduced. In this method, in a state where a tire is mounted to the rim, a deformed region of sidewalls is increased, thereby restraining deformation behavior of a tread region. However, in order to use this method, a flange portion of the rim needs to be formed in a particular shape. Therefore, a problem arises that it is difficult to diffuse such products in the market.

A method is also known in which an internal pressure of a tire is set so as to be higher than usual, to reduce deformation of the tire under load. However, in this method, a stiffness constant of the tire is increased, and attenuation of vibration thus becomes poor, so that ride comfort may be deteriorated.

In JP57-87704, it is indicated that internal loss due to repeated bending deformation of a belt around a tire equator, exerts a great influence on rolling resistance of the tire, and the internal loss can be reduced when a shape of a tread surface and a shape of a disposed belt satisfy a specific relationship. In this technique, as a parameter concerning a tire configuration that exerts an influence on rolling resistance, depressed dimensions (displacements in the radially inward direction) of a top position of the tread surface and a top position of a belt surface, in the tire under load, are used. In this technique, alignment over a wide range in the tire is not considered.

Further, in JP06-199105, a radial tire configured to restrain uneven wear in shoulder portions of a tread, is suggested. The configuration of this tire is defined by a relationship among a displacement (may be referred to as a degree of camber) of a tread surface in a radially inward direction of the tire, a displacement of a belt in the radially inward direction of the tire, a displacement of a carcass in the radially inward direction of the tire, and a size of an effective region of the belt in a belt width direction, in a predetermined range near outer ends in the belt width direction. However, alignment over a wide range in the tire is not also considered in this technique.

SUMMARY OF THE INVENTION

The present invention is made in view of these situations, and an object of the present invention is to make available a pneumatic tire that allows rolling resistance to be reduced and allows wear in shoulder portions to be restrained.

A pneumatic tire according to the present invention includes:

a tread having an outer surface that forms a tread surface;

sidewalls extending in a radially inward direction of the tire, from both ends, in a tire axial direction, of the tread;

a carcass disposed along and inward of the tread and the sidewalls; and a belt provided inward of the tread in a tire radial direction so as to be layered over the carcass, in which on a cross-section taken along a plane including an axis of the tire, a distribution of a thickness $Tg(y)$ of the tread in a region extending in an axially outward direction of the tire from a tread crown center corresponding to an equator position, is represented by a following equation, $$Tg(y)=A-a\times Ct(y),$$

in equation,

A represents a thickness of the tread at the tread crown center, $Ct(y)$ represents a distribution of a displacement of the tread surface in the radially inward direction of the tire, in a region from the tread crown center to an end portion of the belt, and a represents a coefficient selected from a range from greater than or equal to 0.10 to not greater than 0.35, on the cross-section of the tire, and a distribution of a displacement $Cc(y)$ of the carcass in the radially inward direction of the tire, in a region extending in the axially outward direction of the tire from a position corresponding to the tread crown center, is represented by a following equation.

$$Cc(y)=(1-a)\times Ct(y).$$

Preferably, in the pneumatic tire, a number of the belt layered is one or more, and the displacement Cc of the carcass in the radially inward direction of the tire at an end position of the belt having the smallest width, is greater than or equal to 4.0 mm, and is not greater than 6.1 mm.

Preferably, in the pneumatic tire, a number of the belt layered is one or more, and the displacement Cc of the carcass in the radially inward direction of the tire at a position that is distant by 10 mm in the axially outward direction of the tire from an end position of the belt having the smallest width, is greater than or equal to 8.6 mm, and is not greater than 11.0 mm.

Preferably, in the pneumatic tire, a number of the belt layered is one or more, the coefficient a for a region extending outward of an end position of the belt having the smallest width to a position distant by 10 mm in the axially outward direction of the tire from the end position of the belt having the smallest width, is less than 0.30, and the coefficient a for a region extending in an axially inward direction of the tire from the end position of the belt having the smallest width, is greater than or equal to 0.30.

Preferably, in the pneumatic tire, the coefficient a for the region extending outward of the end position of the belt having the smallest width to the position distant by 10 mm in the axially outward direction of the tire from the end position of the belt having the smallest width, is greater than or equal to 0.15, and is less than 0.30.

Preferably, in the pneumatic tire, the belt includes two belts that are layered over each other and that have widths different from each other, bands are layered over step portions that are included in the belt having a greater width and that project from the belt having a smaller width, and the bands are formed of cords and a topping rubber.

DESCRIPTION OF THE PREFERRED EMBODIMENTS

The following will describe in detail the present invention based on preferred embodiments with reference to the accompanying drawing.

Figure 1:
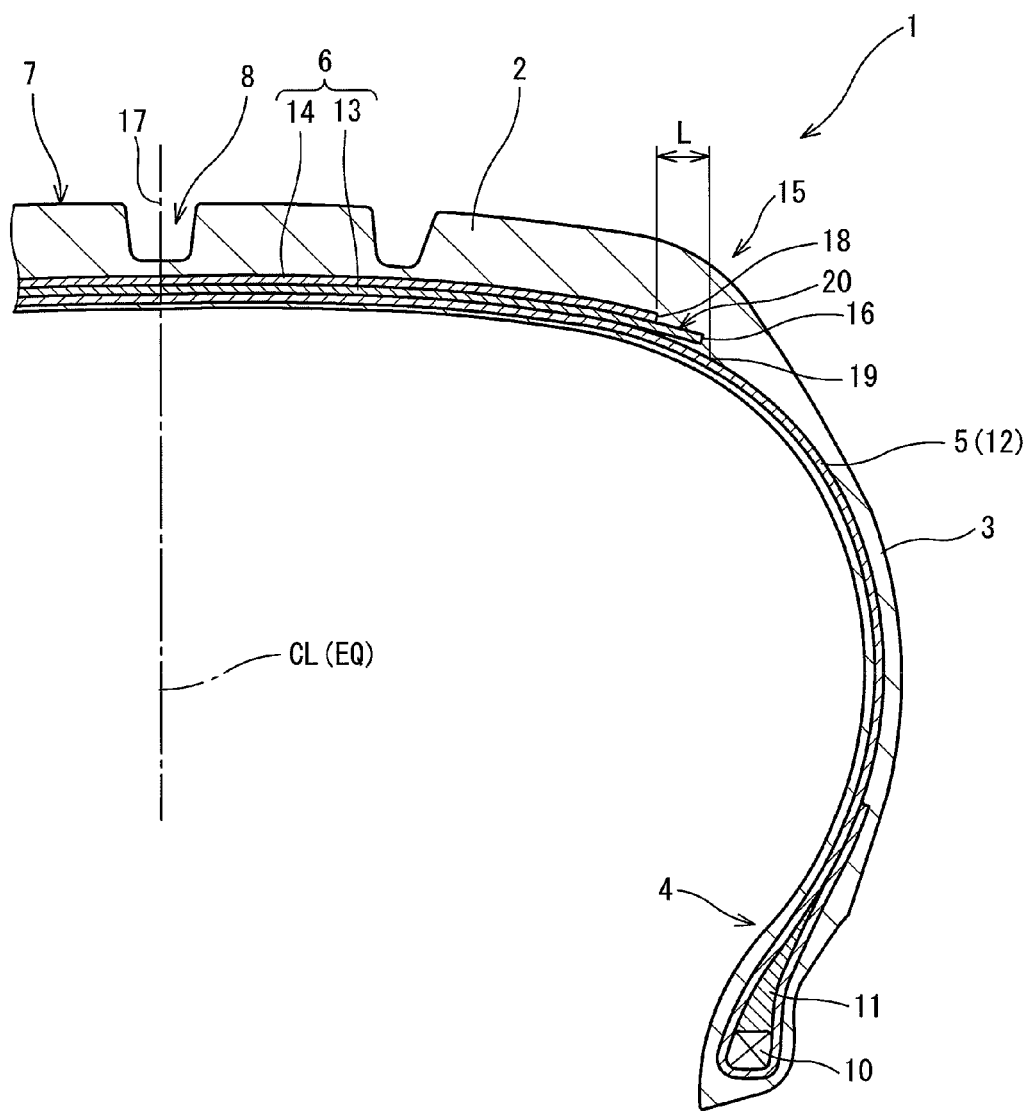
FIG. 1 is a cross-sectional view of a pneumatic tire according to one embodiment of the present invention, as taken along a plane including a central axis of the tire.

FIG. 1 is a cross-sectional view of a part of a pneumatic tire 1 according to one embodiment of the present invention, as taken along a tire-meridian direction. In FIG. 1, the upward/downward direction represents the tire radial direction (hereinafter, may be referred to simply as the radial direction), the leftward/rightward direction represents the tire axial direction (hereinafter, may be referred to simply as the axial direction), and the direction orthogonal to the surface of the sheet represents the tire circumferential direction (hereinafter, may be referred to simply as the circumferential direction). The tire 1 has a shape which is almost bilaterally symmetric about a center line CL shown in FIG. 1. The center line CL may be referred to also as a tread center line, and represents an equator plane EQ of the tire 1.

The tire 1 includes a tread 2, sidewalls 3, beads 4, a carcass 5, and a belt 6. The tire 1 is of a tubeless type.

The tread 2 is formed of a crosslinked rubber excellent in wear resistance. The tread 2 includes a tread surface 7. The tread surface 7 has a shape projecting in the radially outward direction on a cross-section taken along the meridional direction of the tire 1. The tread surface 7 can contact with a road surface. The tread surface 7 has a plurality of grooves 8 formed therein so as to extend in the circumferential direction. A tread pattern is formed by the grooves 8. Outer portions, in the tire axial direction (tire width direction), of the tread 2 are referred to as shoulder portions 15. The sidewalls 3 extend from ends of the tread 2 in almost radially inward direction. The sidewalls 3 are formed of a crosslinked rubber.

As shown in FIG. 1, the beads 4 are positioned almost inward of the sidewalls 3, respectively, in the radial direction. The beads 4 each include a core 10, and an apex 11 extending from the core 10 in the radially outward direction. The core 10 is formed so as to be ring-shaped along the tire circumferential direction. The core 10 is formed so as to be wound with a non-stretchable wire. A steel wire is typically used for the core 10. The apex 11 is tapered in the radially outward direction. The apex 11 is formed of a highly hard crosslinked rubber.

The carcass 5 is formed as a carcass ply 12. The carcass ply 12 extends on and between the beads 4 located on both sides, and extends along the tread 2 and the sidewalls 3 in a region inward thereof. The carcass ply 12 is turned up around each core 10 from the inner side to the outer side in the tire axial direction. The carcass ply 12 is formed of multiple cords aligned with each other, and a topping rubber, which is not shown. An absolute value of an angle of each cord relative to the equator plane EQ (CL) ranges from 70° to 90° in general. In other words, the carcass 5 forms a radial structure.

The belt 6 is disposed outward of the carcass 5 in the radial direction. The belt 6 is layered over the carcass 5. The belt 6 reinforces the carcass 5. The belt 6 includes an inner belt 13 and an outer belt 14. In the present embodiment, the belts 13 and 14 have widths different from each other. In the present embodiment, a width of the inner belt 13 is greater than a width of the outer belt 14. A difference in width between the belt 13 and the belt 14 is preferably greater than or equal to 10 mm, and is preferably not greater than 20 mm. More specifically, the inner belt 13 having a greater width includes a portion (step) 20 that projects outward from each end portion of the outer belt 14 having a smaller width, and the portion (step) 20 has a width that is preferably greater than or equal to 5 mm, and is preferably not greater than 10 mm. When the width is less than 5 mm, slipping is increased on the outer sides of end portions of the belt 6 (axially outward sides), and thus step wear (difference in height between the outer side and the inner side of each end portion) may occur. On the other hand, when the width is greater than 10 mm, rising behavior is enhanced near the end portions of the belt 6, and thus uneven wear may occur.

Each of the inner belt 13 and the outer belt 14 is formed of multiple cords aligned with each other, and a topping rubber, which is not shown. Each cord is tilted relative to the equator plane EQ. A direction in which each cord of the inner belt 13 is tilted is opposite to a direction in which each cord of the outer belt 14 is tilted.

When a camber angle is set for the tire 1, an outer edge (referred to as a ground-contact edge) of a ground-contact surface of the tread is moved outward in the tire axial direction. Also in this case, at least an end portion (edge portion) 16, in the width direction, of the inner belt 13 having a greater width is formed so as to be positioned outward of the ground-contact edge in the tire axial direction. The width of the inner belt 13 is set such that the edge portion 16 is positioned outward of the ground-contact edge in the tire axial direction also when a camber angle is set for the tire 1 in a range of 1.5°±0.5°. The belt 6 having been thus formed can prevent reduction of wear resistance in the shoulder portions 15 even in a tire for which a camber angle is set.

It is advantageous that a band is layered outward of the belt 6 in the radial direction, which is not shown. The band has a width greater than the width of the belt 6. The band is formed of cords and a topping rubber. The cords are helically wound. The belt is held by the cords, thereby restraining lifting of the belt 6. The cords are formed of an organic fiber. Examples of the preferable organic fiber include nylon fibers, polyester fibers, rayon fibers, polyethylene naphthalate fibers, and aramid fibers.

It is advantageous that edge bands are provided, outward of the belt 6 in the radial direction, near the end portions (edge portions), in the width direction, of the belt 6, which is not shown. Each edge band is also formed of cords and a topping rubber, similarly to the band described above. One example of the edge band is an edge band that is layered over top surfaces of the step 20 portions of the inner belt 13 having a greater width. The cords of each edge band are tilted in the same direction as the direction in which the cords of the outer belt 14 having a smaller width are titled, and are biased relative to the cords of the inner belt 13 having a greater width. A tilt angle of each cord of the edge bands is greater than or equal to 20°, and is not greater than 90°. The edge bands restrain behavior caused by discontinuity in stiffness, which is likely to occur in the width direction in the edge portions of the belt 6. As a result, generation of uneven wear can be restrained.

It is advantageous that cushion rubber layers are layered over the carcass 5 near the end portions, in the width direction, of the belt 6, which is not shown. The cushion rubber layers are formed of a flexible crosslinked rubber. The cushion rubber layers absorb stress on the ends of the belt. The cushion rubber layers restrain lifting of the belt.

Figure 2:
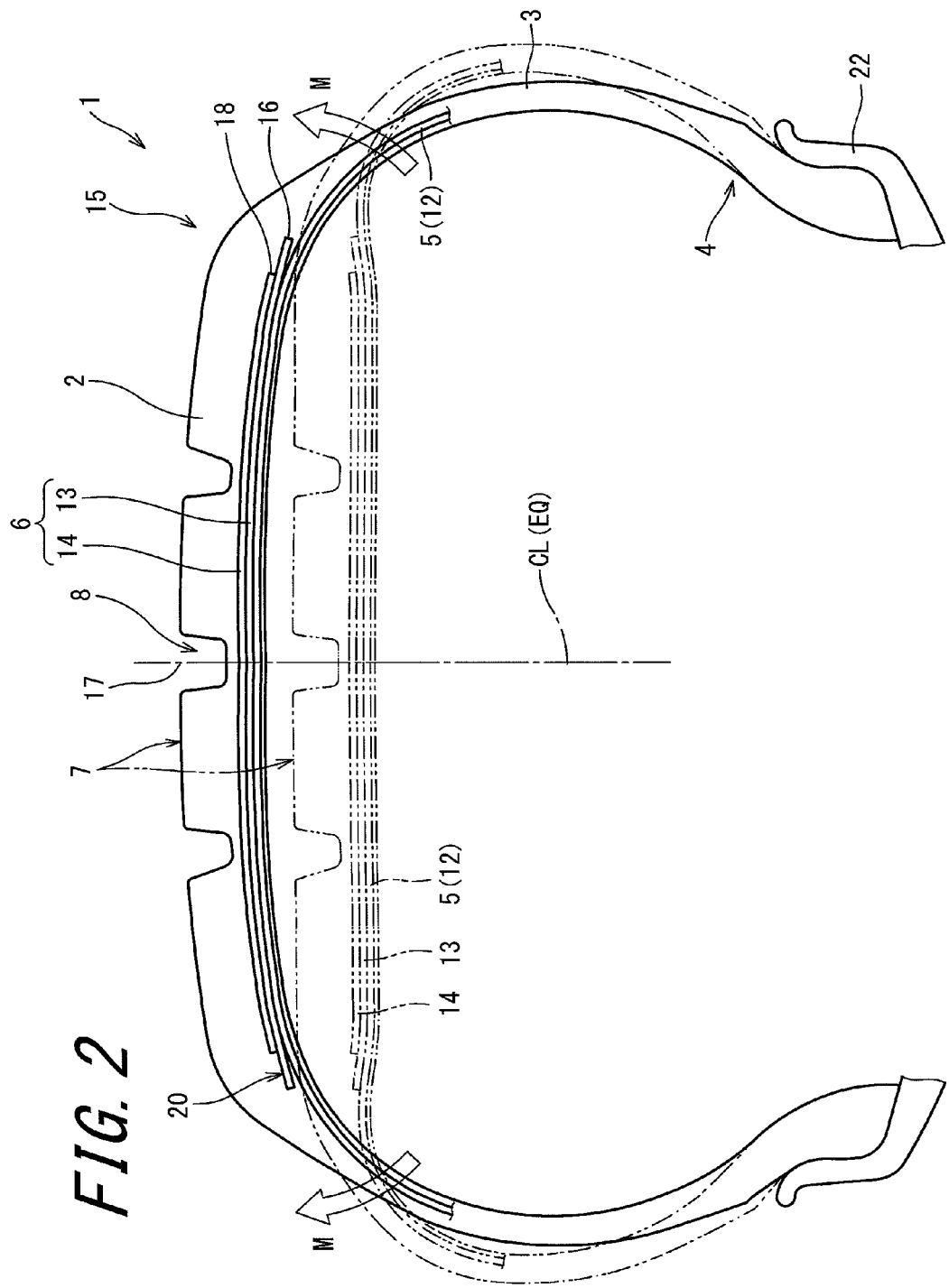
FIG. 2 is a cross-sectional view illustrating an exemplary deformation of the tire in FIG. 1 under load.

FIG. 2 shows a typically deformed state of the tire 1 which is mounted to a rim 22, is inflated to an internal pressure and is under load. The tire 1 is formed of a composite component of the rubbers 2, 3, and 11, and the cords 5, 6, and 10 as described above. The carcass 5 and the belt 6 which have a high stiffness are in balance with the internal pressure of the tire, to maintain a shape as the tire 1. When a load from a vehicle body and/or a load due to running are applied to the tire 1, the tread surface 7 is flattened along a road surface as indicated by an alternate long and two short dashes line in FIG. 2. The tread surface 7 is displaced approximately in the radially inward direction. Displacement equivalent to the load on the tread is transferred also to the belt 6 and the carcass 5 inside the tire 1, and a bending moment M is applied so as to change curvatures of the belt 6 and the carcass 5. Bending energy generated at this time causes increase of rolling resistance in the tire. In a tire, the greater the deformation of the tread 2 is, the lower a tolerance to rolling resistance becomes. In particular, disadvantage to a tire in which the belt 6 and the carcass 5 each having a high stiffness are greatly deformed is further increased. A layered component of the belt 6 and the carcass 5 is also referred to as a breaker package.

A behavior of the breaker package is directly influenced by a displacement of the tread surface 7 in the radially inward direction of the tire in a state where the tire is inflated to an internal pressure. A distribution of the displacement in the tire axial direction represents a contour of the tread surface 7. In general, the displacement is increased from a crown center 17 outward in the tire axial direction. In the tire having such a shape, a behavior is enhanced in a region from shoulder portions of the tread toward buttress portions during rotation. Rolling resistance is greatly influenced by deforming energy of the tread rubber and the breaker package in this region.

The tire 1 is designed so as to reduce bending energy generated during rotation. In the tire 1, distribution in thickness of the tread along the tire axial direction is regulated. Further, the tire 1 is configured such that a displacement of the tread surface 7 in the radially inward direction of the tire and a displacement of the carcass in the radially inward direction of the tire, along the tire axial direction, satisfy a predetermined relationship. The bending energy during rotation is reduced by these configurations. The thickness of the tread represents a dimension from the tread surface to the top surface of the carcass in the tire radial direction on a cross-section taken along a plane including the tire axis.

Figure 3:
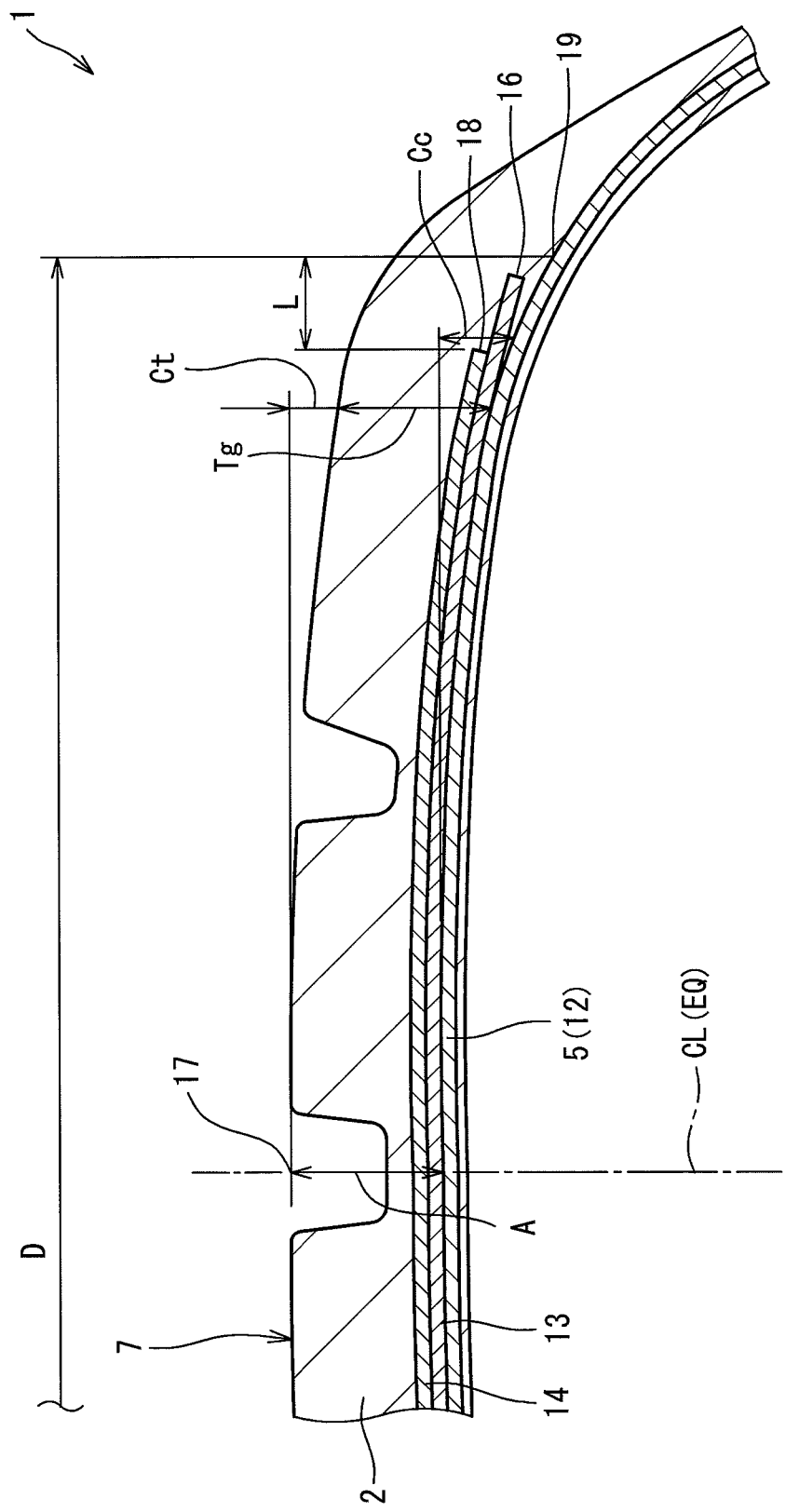
FIG. 3 is a cross-sectional view schematically illustrating shapes and configurations of a tread and a carcass of the tire in FIG. 1.

FIG. 3 shows a cross-section of the tread 2 portion of the tire 1 as taken along a plane including the tire axis. With reference to FIG. 3, a relationship among a distribution in thickness of the tread 2, a displacement of the tread surface 7 in the radially inward direction of the tire, and a displacement of the carcass in the radially inward direction of the tire, along the tire axial direction, can be described.

A thickness $Tg(y)$ of the tread 2 in the tire radial direction in a region extending in the axially outward direction of the tire from the crown center 17 corresponding to a position of the equator EQ, is represented by equation (1) as below.

$$Tg(y) = A - a \times Ct(y) \tag{1}$$

In equation (1), y represents a position in the tire axial direction. Therefore, equation (1) represents a distribution in thickness of the tread 2 in the region extending from the crown center 17 in the axially outward direction of the tire. A represents a thickness of the tread 2 at the crown center 17. $Ct(y)$ represents a displacement of the tread surface 7 in the radially inward direction of the tire at a position corresponding to the thickness $Tg(y)$ of the tread 2. It can be said that $Ct(y)$ represents a distribution of the displacement in the tire axial direction. a represents a coefficient selected from a range from greater than or equal to 0.10 to not greater than 0.35. Therefore, equation (1) indicated above represents $$0.10 Ct(y) \leq A - Tg(y) \leq 0.35 Ct(y).$$

A terminating end of the range for y is not limited to any specific position. However, equation (1) is advantageously applied to a range to the vicinity of the outermost end of a ground-contact surface obtained in the case of a camber angle being set for a wheel to which the tire is mounted. A range of the camber angle is 1.5°±0.5°. In this viewpoint, a range D for y is advantageously from the crown center 17 to a position 19 that is distant by 10 mm in the outward direction from an end position 18 (FIG. 3) of the belt 14 having the smallest width. In this case, equation (1) represents a distribution in thickness of the tread 2 in a region from the crown center 17 to the position 19 that is distant by 10 mm in the outward direction from the end position 18 of the belt 14.

The tire 1 is configured such that, in addition to the tread thickness distribution $Tg(y)$ satisfying equation (1), the displacement $Ct(y)$ of the tread surface 7 in the radially inward direction of the tire, and a displacement $Cc(y)$ of the carcass 5 in the radially inward direction of the tire satisfy a relationship represented by equation (2) indicated below.

$$Cc(y) = (1-a) \times Ct(y) \tag{2}$$

The displacements $Cc(y)$ and $Ct(y)$ represent displacements of the carcass 5 and the tread surface 7 at mutually corresponding positions in the tire axial direction. It can be said that $Cc(y)$ also represents a distribution of the displacement in the tire axial direction. The distribution of the displacement $Cc(y)$ of the carcass 5 is obtained based on a so-called natural equilibrium form line of the tire 1 inflated to an internal pressure. The coefficient a is in the range from greater than or equal to 0.10 to not greater than 0.35, as described above. Therefore, equation (2) represents $$0.65 \leq Cc(y)/Ct(y) \leq 0.90.$$

Figure 4A:
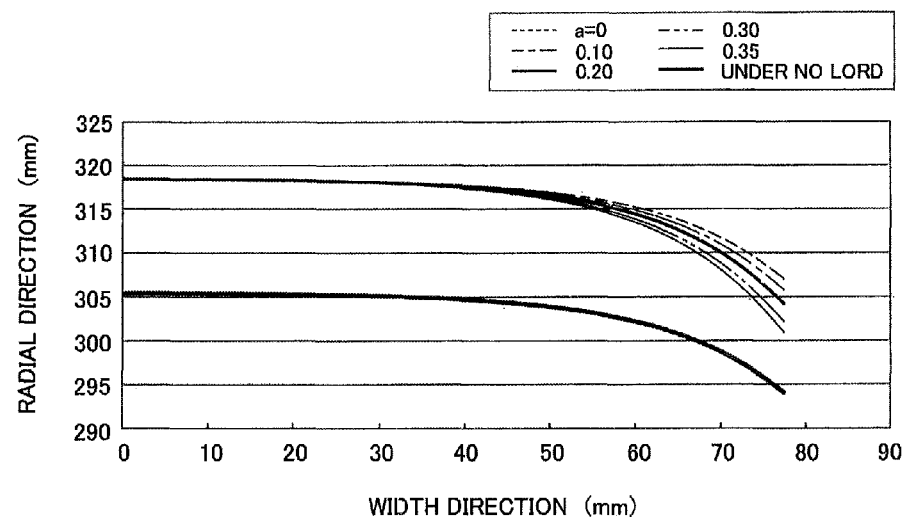
FIG. 4A is a cross-sectional view schematically illustrating a relationship between a shape of the disposed carcass and a tread surface in the tire.
Figure 4B:
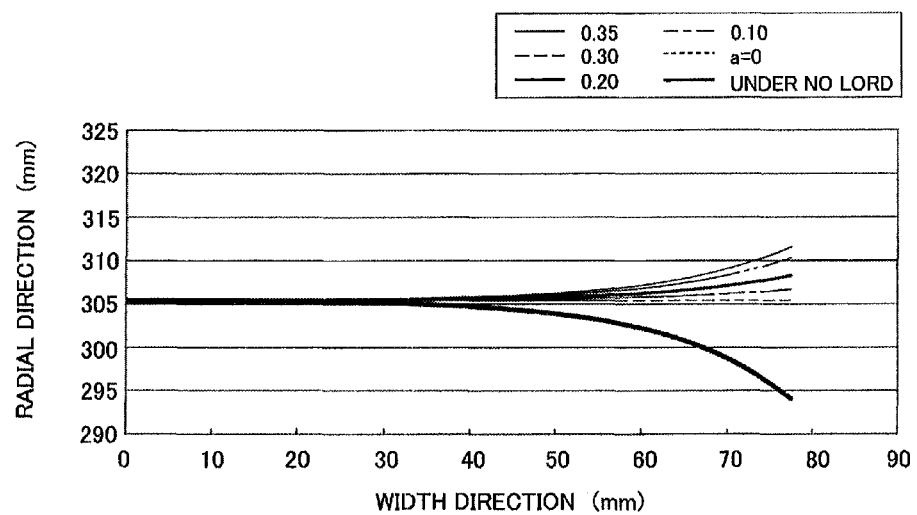
FIG. 4B is a cross-sectional view schematically illustrating a shape of the disposed carcass under no load and a shape of the displaced carcass under load in the tire shown in FIG. 4A.

FIG. 4 shows changes of the carcass 5 and the tread surface 7 according to the coefficient a being changed in equations (1) and (2). FIG. 4A shows change of positions of the tread surface 7 relative to a disposition of the carcass 5 under no load, for five values of the coefficient a. FIG. 4B shows change in displacement of the carcass 5 under load relative to a disposition of the carcass 5 under no load, for the five values of the coefficient a. In FIG. 4A, the horizontal axis represents a position in the tire axial direction based on the crown center 17 of the tread being an originating point, and the vertical axis represents a position in the tire radial direction. A shape of the disposed carcass 5 in a state where the tire is inflated to an internal pressure and is under no load is indicated in the lower portion of FIG. 4A. In the upper portion of FIG. 4A, shapes of the tread surface 7 relative to the shape of the same carcass 5 in a state where the tire is inflated to an internal pressure and is under no load, are indicated. The shapes of the tread surface 7 in the case of the coefficient a representing 0, 0.10, 0.20, 0.30, and 0.35, respectively, are indicated with respect to the shape of the same carcass 5. The shape under no load is indicated by a thick line, a shape in the case of a=0 is indicated by a dashed line, a shape in the case of a=0.10 is indicated by an alternate long and short dash line, a shape in the case of a=0.20 is indicated by a medium-thick line, a shape in the case of a=0.30 is indicated by an alternate long and two short dashes line, and a shape in the case of a=0.35 is indicated by a thin line. A tendency of a distribution in tread thickness, and a relationship in displacement in the radially inward direction of the tire between the carcass 5 and the tread surface 7, according to the coefficient a being changed, are clearly indicated. The greater the coefficient a is, the greater the reduction of the tread thickness is toward the axially outward direction of the tire, and the greater the coefficient a is, the less $Cc(y)/Ct(y)$ is.

Also in FIG. 4B, the horizontal axis represents a position in the tire axial direction based on the crown center 17 of the tread being an originating point, and the vertical axis represents a position in the tire radial direction. Similarly to FIG. 4A, a shape of the disposed carcass 5 in a state where the tire is inflated to an internal pressure and is under no load is indicated in the lower portion of FIG. 4B. Shapes of the same carcass 5 having been displaced in a state where the tire is inflated to an internal pressure and is under load, are indicated in the upper portion of FIG. 4B. The shapes of the displaced carcass 5 under load in the case of the coefficient a representing 0, 0.10, 0.20, 0.30, and 0.35, respectively, are indicated with respect to the shape of the same carcass 5 under no load (as indicated in the lower portion in FIG. 4B). The same types of lines are used in FIG. 4B in the same manner as in FIG. 4A. Difference in rising behavior of the carcass 5, in the tire under load, according to the coefficient a being changed is clearly indicated. The greater the coefficient a is, the greater the behavior of the carcass 5 in a region toward the shoulder portion 15 is.

As described above, in equations (1) and (2), the coefficient a is a value selected from a range of values that are greater than or equal to 0.10, and are not greater than 0.35. When the coefficient a is less than 0.10, the tread thickness near the shoulder portions 15 is increased. Namely, a distribution in the tread thickness becomes approximately uniform. As a result, a ground-contact pressure in the shoulder portions 15 is increased, and wear resistance and tolerance to rolling resistance may be thus deteriorated. On the other hand, when the coefficient a is greater than 0.35, the tread thickness near the shoulder portions 15 is reduced. As a result, grooves formed in a tread surface have to be shallow. If the tread portion is worn uniformly over the entirety thereof, the shoulder portions may be worn out earlier than the crown portion, so that deterioration due to an appearance may occur. In this viewpoint, the coefficient a is more preferably selected from a range of values that are greater than or equal to 0.20, and are not greater than 0.30.

In the tire 1 according to the present embodiment, the displacement $Cc(y)$ of the carcass 5 in the radially inward direction of the tire may be regulated, as follows, in the end positions of the belt 6 and the vicinity thereof. That is, the displacement $Cc(y)$ at the end position 18 (FIG. 3) of the belt 14 having the smallest width may be greater than or equal to 4.0 mm, and is not greater than 6.1 mm. Further, the displacement $Cc(y)$ at the position 19 that is distant by a distance L of 10 mm in the axially outward direction of the tire from the end position 18, may be set so as to be greater than or equal to 8.6 mm, and be not greater than 11.0 mm. These requirements are applicable also to a case where the number of the belts is one.

In both a case where the displacement $Cc(y)$ of the carcass 5 at the belt end position 18 is greater than 6.1 mm, and a case where the displacement $Cc(y)$ of the carcass 5 at the position 19 that is distant by the distance L of 10 mm in the axially outward direction of the tire from the end position 18, is greater than 11.0 mm, a behavior of the shoulder portions 15 under load is enhanced, and wear resistance and tolerance to rolling resistance may be deteriorated. From the viewpoint that tolerance to rolling resistance is improved, the displacement $Cc(y)$ of the carcass 5 is advantageously small at both the position 18 and the position 19. However, when the displacement $Cc(y)$ is less than 4.0 mm at the belt end position 18, or when the displacement $Cc(y)$ is less than 8.6 mm at the position 19 that is distant by the distance (L) of 10 mm in the axially outward direction of the tire from the end position 18, a tire maximum width position needs to be made higher (be shifted in the radially outward direction of the tire), or a tire width needs to be increased. When the tire width is increased, the tire may be outside the standards of the tire. When the maximum width position is made higher, the thickness of the bead portions 4 needs to be increased, and tolerance to rolling resistance is thus deteriorated in the bead portions 4. Further, the tread thickness in the shoulder portions 15 is reduced, so that mounting of the belt 6 may become difficult, and/or the depth of the grooves in the tread 2 may be excessively reduced.

Further, in the tire 1 according to the present embodiment, the coefficient a for equations (1) and (2) may be different between a region extending inward of the end position of the belt 6 and a region extending outward thereof. Specifically, the coefficient a is greater than or equal to 0.30, and is not greater than 0.35 in a region from the crown center 17 to the end position 18 of the belt 14 having the smallest width. The coefficient a is greater than or equal to 0.10, and is less than 0.30 in a region extending outward of the end position 18 to the position 19 that is distant by 10 mm in the axially outward direction of the tire from the end position 18. In such a configuration, a rising behavior in a region extending outward of the end position 18 of the belt 14 is restrained. As a result, improvement of wear resistance and improvement of tolerance to rolling resistance in the shoulder portions 15 can be expected. In this viewpoint, the coefficient a is preferably greater than or equal to 0.15, and is preferably less than 0.30. These requirements are applicable also to a case where the number of the belts is one.

Hereinafter, a manner in which rolling resistance of the tire is measured for evaluation of the characteristics of the tire 1, and a manner in which wear at an edge of the shoulder portion 15 is evaluated for evaluation of the characteristics of the tire 1, will be described.

[Measurement of Rolling Resistance]

A bench tester having a drum driven to rotate is used for measuring a rolling resistance of a tire. A size of sample tires is 195/65R15. A value of rolling resistance is measured for each of forward rotation and backward rotation of the tire. An ambient temperature for the test is set as 25° C. Alignment of the sample tire mounted to a rim for use in tests is set such that a toe angle is 0° and a camber angle is 0°. A tire internal pressure is 210 kPa, and a load on the tire is 415 kgf. A running speed for the sample tire is 80 km/h.

[Evaluation for Wear at Edge]

A tire having the same specifications as the tire having rolling resistance measured as described above, is evaluated for wear at an edge of the shoulder portion, by using a wear energy measuring machine. A size of sample tires is 195/65R15. An ambient temperature for the test is set as 25° C. Alignment of the sample tire mounted to a rim for use in tests is set such that a toe angle is 0° and a camber angle is 1.5°. A tire internal pressure is 210 kPa, and a load on the tire is 415 kgf. A method of evaluation for wear at the edge is implemented by measuring wear energy in a crown portion, a mid-portion (between the crown portion and a shoulder portion), and the shoulder portion (edge portion) of a tread. In a case where wear energy in the shoulder portion (edge portion) is higher than wear energy in each of the crown portion and the mid-portion, evaluation result indicates "poor".

EXAMPLES

Hereinafter, effects of the present invention will become apparent according to examples. However, the present invention should not be restrictively construed based on the description of examples.

Examples 1 to 4

Pneumatic tires as shown in FIG. 1 were produced as tires of Examples 1 to 4. The size of each tire was 195/65R15. The displacement Ct of the tread surface 7 in the radially inward direction (radial direction) of the tire, the displacement Cc of the carcass 5 in the radially inward direction of the tire, the thickness Tg of the tread 2, and the coefficient a in equation for the thickness Tg, at each of the end position 18 of the belt 14 having the smallest width in each tire, and the position 19 that is distant by a distance (L) of 10 mm in the axially outward direction of the tire from the end position 18, are as indicated in Table 1. The other structures of the tire are the same among Examples 1 to 4. Each tire according to Examples 1 to 4 was evaluated for rolling resistance and wear at an edge of the shoulder portion 15. A method and procedure for the evaluation are as described above. The evaluation results are indicated as indexes in Table 1.

Examples 5 to 8

Pneumatic tires as shown in FIG. 1 were produced as tires of Examples 5 to 8. The displacement Ct of the tread surface 7 in the radially inward direction of the tire, the displacement Cc of the carcass 5 in the radially inward direction of the tire, the thickness Tg of the tread 2, and the coefficient a in equation for the thickness Tg, at each of the end position 18 of the belt 14 having the smallest width in each tire, and the position 19 that is distant by a distance (L) of 10 mm in the axially outward direction of the tire from the end position 18, are as indicated in Table 2. The other structures of each tire are the same as those of Example 1. Each tire according to Examples 5 to 8 was evaluated for rolling resistance and wear at an edge of the shoulder portion 15. A method and procedure for the evaluation are as described above. The evaluation results are indicated as indexes in Table 2.

Examples 9 and 10

Pneumatic tires as shown in FIG. 1 were produced as tires of Examples 9 and 10. The displacement Ct of the tread surface 7 in the radially inward direction of the tire, the displacement Cc of the carcass 5 in the radially inward direction of the tire, the thickness Tg of the tread 2, and the coefficient a in equation for the thickness Tg, at each of the end position 18 of the belt 14 having the smallest width in each tire, and the position 19 that is distant by a distance (L) of 10 mm in the axially outward direction of the tire from the end position 18, are as indicated in Table 3. The other structures of each tire are the same as those of Example 1. Each tire according to Examples 9 and 10 was evaluated for rolling resistance and wear at an edge of the shoulder portion 15. A method and procedure for the evaluation are as described above. The evaluation results are indicated as indexes in Table 3.

Comparative Example 1

A pneumatic tire as shown in FIG. 1 was produced as a tire of Comparative Example 1. The displacement Ct of the tread surface 7 in the radially inward direction of the tire, the displacement Cc of the carcass 5 in the radially inward direction of the tire, the thickness Tg of the tread 2, and the coefficient a in equation for the thickness Tg, at each of the end position 18 of the belt 14 having the smallest width in the tire, and the position 19 that is distant by a distance (L) of 10 mm in the axially outward direction of the tire from the end position 18, are as indicated in Table 1. The other structures of the tire are the same as those of Example 1. The tire according to Comparative Example 1 was evaluated for rolling resistance and wear at an edge of the shoulder portion 15. A method and procedure for the evaluation are as described above. The evaluation results are indicated as indexes in Table 1.

Comparative Example 2

A pneumatic tire as shown in FIG. 1 was produced as a tire of Comparative Example 2. The displacement Ct of the tread surface 7 in the radially inward direction of the tire, the displacement Cc of the carcass 5 in the radially inward direction of the tire, the thickness Tg of the tread 2, and the coefficient a in equation for the thickness Tg, at each of the end position 18 of the belt 14 having the smallest width in the tire, and the position 19 that is distant by a distance (L) of 10 mm in the axially outward direction of the tire from the end position 18, are as indicated in Table 2. The other structures of the tire are the same as those of Example 1. The tire according to Comparative Example 2 was evaluated for rolling resistance and wear at an edge of the shoulder portion 15. A method and procedure for the evaluation are as described above. The evaluation results are indicated as indexes in Table 2.

Comparative Example 3

A pneumatic tire as shown in FIG. 1 was produced as a tire of Comparative Example 3. The displacement Ct of the tread surface 7 in the radially inward direction of the tire, the displacement Cc of the carcass 5 in the radially inward direction of the tire, the thickness Tg of the tread 2, and the coefficient a in equation for the thickness Tg, at each of the end position 18 of the belt 14 having the smallest width in the tire, and the position 19 that is distant by a distance (L) of 10 mm in the axially outward direction of the tire from the end position 18, are as indicated in Table 3. The other structures of the tire are the same as those of Example 1. The tire according to Comparative Example 3 was evaluated for rolling resistance and wear at an edge of the shoulder portion 15. A method and procedure for the evaluation are as described above. The evaluation results are indicated as indexes in Table 3.

TABLE 1

| | | Evaluation Results | | | | |
|---|---|---|---|---|---|---|
| | | Comparative Example 1 | Example 1 | Example 2 | Example 3 | Example 4 |
| End position 18 of belt 14 having smallest width | Coefficient a | 0.00 | 0.10 | 0.20 | 0.30 | 0.35 |
| | Ct (mm) | 4.6 | 5.2 | 5.8 | 6.6 | 7.1 |
| | Tg (mm) | 13.0 | 12.5 | 11.8 | 11.0 | 10.5 |
| | Cc (mm) | 4.6 | 4.6 | 4.6 | 4.6 | 4.6 |
| Position 19 distant by 10 mm in axially outward direction from end position 18 of belt 14 having smallest width | Coefficient a | 0.00 | 0.10 | 0.20 | 0.30 | 0.35 |
| | Ct (mm) | 9.6 | 10.7 | 12.0 | 13.8 | 14.8 |
| | Tg (mm) | 13.0 | 11.9 | 10.6 | 8.9 | 7.8 |
| | Cc (mm) | 9.6 | 9.6 | 9.6 | 9.6 | 9.6 |
| Rolling resistance (Index) | | 100 | 96 | 95 | 94 | 101 |
| Wear at edge (Index) | | 98 | 101 | 103 | 105 | 102 |

TABLE 2

| | | Evaluation Results | | | | |
|---|---|---|---|---|---|---|
| | | Comparative Example 2 | Example 5 | Example 6 | Example 7 | Example 8 |
| End position 18 of belt 14 having smallest width | Coefficient a | 0.40 | 0.30 | 0.30 | 0.30 | 0.35 |
| | Ct (mm) | 7.7 | 5.6 | 5.8 | 8.6 | 9.2 |
| | Tg (mm) | 9.9 | 11.3 | 11.3 | 10.4 | 10.3 |
| | Cc (mm) | 4.6 | 3.9 | 4.0 | 6.0 | 6.4 |
| Position 19 distant by 10 mm in axially outward direction from end position 18 of belt 14 having smallest width | Coefficient a | 0.40 | 0.30 | 0.30 | 0.30 | 0.30 |
| | Ct (mm) | 16.1 | 12.1 | 12.3 | 15.1 | 16.2 |
| | Tg (mm) | 6.6 | 9.4 | 9.3 | 8.5 | 8.1 |
| | Cc (mm) | 9.6 | 8.5 | 8.6 | 10.6 | 11.3 |
| Rolling resistance (Index) | | 103 | 96 | 95 | 95 | 96 |
| Wear at edge (Index) | | 90 | 101 | 103 | 103 | 102 |

TABLE 3

| | | Evaluation Results | | |
|---|---|---|---|---|
| | | Comparative Example 3 | Example 9 | Example 10 |
| End position 18 of belt 14 having smallest width | Coefficient a | 0.00 | 0.30 | 0.30 |
| | Ct (mm) | 6.4 | 6.6 | 6.6 |
| | Tg (mm) | 13.0 | 11.0 | 11.0 |
| | Cc (mm) | 6.4 | 4.6 | 4.6 |
| Position 19 distant by 10 mm in axially outward direction from end position 18 of belt 14 having smallest width | Coefficient a | 0.00 | 0.25 | 0.19 |
| | Ct (mm) | 11.3 | 12.8 | 11.8 |
| | Tg (mm) | 13.0 | 9.8 | 10.8 |
| | Cc (mm) | 11.3 | 9.6 | 9.6 |
| Rolling resistance (Index) | | 102 | 93 | 94 |
| Wear at edge (Index) | | 85 | 106 | 106 |

[Overall Evaluation]

Results of evaluations for various performances of each tire according to Examples 1 to 10 and Comparative Examples 1 to 3 are indicated in Tables 1 to 3. The evaluations for rolling resistance are indicated as indexes based on the result of Comparative Example 1 being 100. The less a value of the index is, the more favorable the evaluation result is. The evaluations for wear at the edge of the shoulder portion 15 are also indicated as indexes based on the result of the Comparative Example 1 being 100. The greater a value of the index is, the more favorable the evaluation result is. The evaluation results clearly indicate that the present invention is superior.

The pneumatic tire described above is applicable to vehicles such as passenger cars and the like. The foregoing description is in all aspects illustrative, and various modifications can be devised without departing from the essential features of the invention.

What is claimed is:

1. An assembly including a pneumatic tire and a rim comprising:
    a tread having an outer surface that fauns a tread surface;
    sidewalls extending in a radially inward direction of the tire, from both ends, in a tire axial direction, of the tread;
    a carcass disposed along and inward of the tread and the sidewalls; and
    a belt provided inward of the tread in a tire radial direction so as to be layered over the carcass, wherein
    in a state where the tire is mounted to the rim and is inflated to an internal pressure, and
    on a cross-section taken along a plane including an axis of the tire,
    the tread thickness distribution $Tg(y)$ in a region extending in an axially outward direction of the tire from a tread crown center corresponding to an equator position that is represented by the following equation, $Tg(y) = A - a \times Ct(y)$, wherein
    A represents the tread thickness at the tread crown center,
    $Ct(y)$ represents the tread surface displacement distribution in the radially inward direction of the tire, in a region from the tread crown center to an end portion of the belt, and
    a represents a coefficient selected from a range from greater than or equal to 0.10 to not greater than 0.35,
    on the cross-section of the tire, and
    the carcass displacement distribution $Cc(y)$ in the radially inward direction of the tire, in a region extending in the axially outward direction of the tire from a position corresponding to the tread crown center, is represented by the following equation, $Cc(y) = (1-a) \times Ct(y)$, wherein the carcass displacement distribution $Cc(y)$ is obtained based on a natural equilibrium form line of the tire,
    the tire has one or more belt layers,
    the coefficient a for a region extending outward of an end position of the belt having the smallest width to a position distant by 10 mm in the axially outward direction of the tire from the end position of the belt having the smallest width, is greater than or equal to 0.19, and is less than or equal to 0.25, and
    the coefficient a for a region extending in an axially inward direction of the tire from the end position of the belt having the smallest width, is greater than or equal to 0.30.

2. The assembly according to claim 1, wherein
    the tire has one or more belt layers, and
    the carcass displacement Cc in the radially inward direction of the tire at an end position of the belt having the smallest width, is greater than or equal to 4.0 mm, and is not greater than 6.1 mm.

3. The assembly according to claim 1, wherein
    the tire has one or more belt layers, and
    the carcass displacement Cc in the radially inward direction of the tire at a position that is distant by 10 mm in the axially outward direction of the tire from an end position of the belt having the smallest width, is greater than or equal to 8.6 mm, and is not greater than 11.0 mm.

4. The assembly according to claim 1, wherein
    the belt includes two belts that are layered over each other and that have widths different from each other,
    bands are layered over step portions that are included in the belt having a greater width and that project from the belt having a smaller width, and
    the bands are formed of cords and a topping rubber.

* * * * *